US005204016A

United States Patent [19]

Hamilton et al.

[11] Patent Number: 5,204,016

[45] Date of Patent: Apr. 20, 1993

[54] NON-CAUSTIC OVEN CLEANER, METHOD FOR MAKING AND METHOD OF USE

[75] Inventors: C. R. Hamilton, Arvada, Colo.; Dennis R. Sampson, Maplewood, Mo.

[73] Assignee: Golden Technologies Company, Inc., Golden, Colo.

[21] Appl. No.: 367,022

[22] Filed: Jun. 16, 1989

[51] Int. Cl.$^5$ .......................... C09D 9/00; C11D 7/50

[52] U.S. Cl. .................................... 252/162; 252/158; 252/554; 252/173; 252/174.21; 134/25.2

[58] Field of Search ............... 252/162, 118, 158, 172, 252/173, 174.21, 135

[56] References Cited

U.S. PATENT DOCUMENTS

| | | | |
|---|---|---|---|
| 2,291,205 | 7/1942 | Borglin | 252/310 |
| 2,422,145 | 6/1947 | Taylor | 99/140 |
| 3,023,144 | 2/1962 | Greathouse et al. | 167/58 |
| 3,933,674 | 1/1976 | Farnsworth | 252/171 |
| 4,336,151 | 6/1982 | Like et al. | 252/106 |
| 4,336,152 | 6/1982 | Like et al. | 252/106 |
| 4,362,638 | 12/1982 | Caskey et al. | 252/90 |
| 4,414,128 | 11/1983 | Goffinet | 252/111 |
| 4,438,009 | 3/1984 | Brusky et al. | 252/90 |
| 4,511,488 | 4/1985 | Matta | 252/162 |
| 4,540,505 | 9/1985 | Frazier | 252/106 |

FOREIGN PATENT DOCUMENTS 1603047 11/1981 United Kingdom .

OTHER PUBLICATIONS

*Consumer Reports,* "Oven Cleaners" Mar., 1987, pp. 140–141.

*Primary Examiner*—Prince Willis, Jr.
*Assistant Examiner*—John F. McNally
*Attorney, Agent, or Firm*—Sheridan Ross & McIntosh

[57] ABSTRACT

A non-caustic oven cleaner comprising a terpene is provided. The terpene is most preferably d-limonene. The oven cleaner further comprises effective amounts of a cleaning surfactant, a foaming agent, a stabilizer, a wetting agent and a viscosity agent. Said oven cleaner is produced by separately pre-mixing the oil phase components and the water phase components and then mixing the oil phase into the water phase. A method for safely cleaning oven residue is provided, comprising heating the oven, contacting the oven cleaner to the interior surfaces of the oven for a specified amount of time, and further rinsing said oven cleaner from the interior surfaces of the oven.

14 Claims, No Drawings

NON-CAUSTIC OVEN CLEANER, METHOD FOR MAKING AND METHOD OF USE

FIELD OF THE INVENTION

This invention relates to a chemical composition for use as a non-caustic cleaner and in particular, as an oven cleaner and processes for producing and for using the same.

BACKGROUND

Cooking in ovens at high temperatures for long periods of time often leads to cleaning problems. Food that splatters onto the interior surfaces of the oven is quickly baked onto the surface, thus making removal of the food difficult. If the oven is not cleaned often, buildup of baked on food occurs rapidly, thereby increasing cleaning difficulty. Hence, there is a need for chemical oven cleaners to quickly and easily remove baked on food and grease.

The chemical formulation for most known oven cleaners typically includes caustics, such as either sodium hydroxide (lye) or potassium hydroxide. While many such products are somewhat effective in their ability to clean ovens, they commonly have a high pH and are therefore undesirable because of associated hazards in handling and application. Fumes from such products are hazardous and irritating to the eyes and throat and can also cause chemical skin burns. Accidental contact of those cleaners with eyes can result in severe damage. Moreover, the odors from these products and their reaction to oven dirt are unpleasant. Finally, as oven cleaning products are generally more effective when the oven is heated, all of the above hazards and objectionable traits are exacerbated when working with heated ovens.

As a consequence of the above-noted characteristics of caustic oven cleaners, precautions must be taken when they are employed. For example, good ventilation is required to dissipate fumes and odors. Protective clothing such as goggles, gloves and aprons should be worn to protect against body contact with the cleaners.

The only known commercial non-caustic oven cleaner available is Easy-Off Non-Caustic Formula made by Boyer-Midway. This product has reduced the above-mentioned hazards considerably, but the product is not as effective as caustic oven cleaners.

The present invention involves an oven cleaning composition comprising a terpene, particularly d-limonene, as a cleaning agent. Limonene has been recognized as a cleaning solvent for other unrelated uses. For example, Frazier in U.S. Pat. No. 4,540,505 (Sep. 10, 1985) discloses a disinfectant spray cleanser containing d-limonene. Farnsworth, U.S. Pat. No. 3,933,674 (Jan. 20, 1976), discloses a cleaning composition containing limonene. Matta, U.S. Pat. No. 4,511,488 (Apr. 16, 1985), discloses a d-limonene based liquid cleaning composition.

In addition to the requirement that oven cleaners effectively remove oven debris, oven cleaners must have certain physical properties. Particularly, oven cleaners must have the ability to adhere to vertical and interior ceiling walls for a sufficient time for the cleaning agents in the composition to act on the oven debris.

A need exists, therefore, for a non-caustic oven cleaner, which effectively cleans oven debris and which has adequate physical properties to clean vertical and interior ceiling oven surfaces. The present invention meets these needs with a novel formulation for cleaning ovens.

Summary of the Invention

According to the present invention, a non-caustic oven cleaner comprising an effective amount of a terpene is produced. The non-caustic oven cleaner preferably comprises a terpene selected from the group consisting of d-limonene, alpha-terpineol, beta-terpineol, alpha-pinene, and beta-pinene, and most preferably comprises d-limonene. Said oven cleaner further comprises an effective amount of a cleaning surfactant, wherein said cleaning surfactant is preferably selected from the group consisting Sole-Mulse B~ and Emsorb 2502~. In addition, said oven cleaner comprises effective amounts of a foaming agent, stabilizer, wetting agent and viscosity agent.

The oven cleaner can be produced by pre-mixing the oil components to form an oil phase and pre-mixing the water components to form a water phase. The oil phase comprises a terpene, chemical stabilizer, mineral seal oil and a surfactant. The water phase comprises a foaming agent, wetting agent, viscosity agent, cleaning surfactant, and water. The oil phase is then mixed into said water phase to produce the oven cleaner composition.

In a further embodiment of the invention, the cleaning composition described above is formulated and/or packaged so that subsequent to application the composition inverts from an oil out emulsion to a water out emulsion. This characteristic can be achieved by use of a hydrocarbon propellant and/or a mechanical breakup actuator.

A method for safely cleaning oven residue comprises heating the oven to not more than 150° F. and contacting said oven cleaner to the interior surfaces of the oven. The oven cleaner is left in contact with interior oven surfaces for a period of time. The oven cleaner is then rinsed from the interior surface of the oven with warm water.

DETAILED DESCRIPTION OF THE INVENTION

The present invention includes a terpene-based oven cleaning composition, a process for making such composition, and a process for use of the same. The composition includes a cleaning agent, cleaning surfactant, foaming agent, chemical stabilizer, wetting agent and viscosity agent. The cleaning agent is the primary agent for dissolving and loosening oven debris. The cleaning surfactant enhances the cleaning effectiveness of the cleaning agent. The foaming agent and viscosity agent effectively alter the physical properties of the cleaning composition such that the cleaning composition clings to vertical walls and the interior overhead ceilings of the oven.

Oven cleaners can be used in both home and commercial applications and in cleaning ovens of industrial food processors. Accordingly, the composition can be utilized to remove oven buildup created in household ovens. Further, the composition can be used in commercial applications by restaurants, institutional food services and industrial food processors. The composition can further be utilized in any non-food application in which oils or other organic materials are baked onto metal, enamel, or other solid surfaces at high temperatures.

In one embodiment of the invention, the preferred cleaning agent is a terpene compound and in particular, is d-limonene. This compound can be derived from various oils, including orange, grapefruit, lime, lemon, burgomot, caraway, spearmint, and peppermint. Other terpenes are effective and may be utilized in the present invention as well. Such compounds include alpha-terpineol, beta-terpineol, alpha-pinene, and beta-pinene. Other acceptable terpene compounds can be identified and selected by experimentation. As used throughout, the term cleaning agent refers to all of the foregoing compounds.

In the present invention, the cleaning agent is present in amounts which are effective to meet the cleaning needs of a particular application. The amount of cleaning agent in the present oven cleaning composition can vary depending on the intended use. For example, many industrial applications may require a high concentration of the cleaning agent in the composition. Household uses may only require a less concentrated formulation. In addition, the composition may be sold to the customers in concentrated form so that it may be diluted to fit the ultimate needs. Typically, the cleaning agent is present in the composition in an amount preferably from about 10 volume percent to about 60 volume percent, more preferably from about 20 volume percent to about 40 volume percent, and most preferably from about 25 volume percent to about 35 volume percent.

In addition to the cleaning agent, the oven cleaning composition contains a cleaning surfactant. The term cleaning surfactant refers generally to a surfactant, or combination of surfactants, which has the characteristic of enhancing the cleaning effectiveness of the present cleaning composition. By testing various commercially available surfactants, some have been found to enhance the cleaning ability of present composition and particularly the effectiveness of a d-limonene-based cleaning composition The use of the cleaning surfactant with the cleaning agent creates a composition that is particularly effective as an oven cleaner.

The present composition can include the use of one or more cleaning surfactants in any given formulation. In one embodiment of the invention, the cleaning surfactant in the oven cleaner composition includes the products marketed under the trademarks Sole-Mulse TM B and Emsorb 2502 TM. Sole-Mulse TM B is sold by the Hodag Corporation, Skokie, Ill. and Emsorb 2502 TM is sold by Quantum Chemical Corporation, Cincinnati, Ohio. Sole-Mulse TM B is a combination of anionic and nonionic surfactants. The active ingredients in Bole-Mulse TM B are identified by CAS numbers 9016-45-9 and 68608-26-4. Sole-Mulse TM is a viscous liquid with a deep amber color. It has a pH (1% aqueous dispersion) of 8.0-10.0, a specific gravity at 25° C. of 1.033, a surfactant activity of 97.0% minimum, a moisture content of 3% maximum. Further, it is soluble in kerosene, diesel and fuel oils, Stoddard solvent, xylene, naphthas, mineral and vegetable oils, and chlorinated hydrocarbons. Emsorb 2502 TM is a sorbitan fatty acid ester lipophilic emulsifier and coupling agent. More particularly, Emsorb 2502 TM is a sorbitan sesquioleate having an HLB (hydrophilic lipophilic balance) number of 4.5. At 25° C., it has a pour point at less than 0. It has a viscosity (cSt 100° F.) of 475. Emsorb 2502 TM has a density in pounds/gallon of 7.9 and a flash point of 500° F. It is insoluble in water and soluble in mineral oil, butyl stearate, glycerol trioleate, Stoddard solvent and- xylene. Both Sole-Mulse TM and Emsorb 2502 TM are surfactants, which further act as emulsifiers, for water-oil systems. Other cleaning surfactants can be identified and utilized as well. The cleaning surfactant is in the oven cleaning composition in an amount effective to obtain the desired cleaning effect. Typically, the cleaning surfactant is present in an amount preferably from about 0.2 volume percent to about 2.0 volume percent, more preferably from about 0.5 volume percent to about 1.7 volume percent, most preferably from about 0.9 volume percent to about 1.3 volume percent. In the event that more than one cleaning surfactant is used in the present invention, the total volume of all such compounds is typically within the above ranges.

In addition to a cleaning surfactant, the present composition can include general surfactants which do not necessarily exhibit an enhancement of the cleaning ability of the total composition. Such general surfactants modify the surface chemistry of the oil phase and water phase compounds in the total composition to allow for a uniform mixture of the oil phase and water phase components. The cleaning surfactant can function as the general surfactant for this purpose. Alternatively, in addition to cleaning surfactants, the present composition can include amounts of general surfactants effective to achieve the desired chemical effect. Typically, when cleaning surfactants are present in the amounts indicated above, general surfactants are added in amounts from about 1.8 volume percent to about 3.4 volume percent, more preferably from about 2.0 volume percent to about 3.2 volume percent and most preferably from about 2.2 volume percent to about 3.0 volume percent.

General surfactants suitable for use in the present invention can be identified and selected by experimentation. In one embodiment of the present invention, a general surfactant is a product marketed under the trademark Macol NP-7.5 TM, sold by Mazer Chemicals, a division of PPG Chemicals group, Gurnee, Ill. It is a non-ionic surfactant prepared from a nonyl phenol, CAS number 9016-45-9. Another suitable general surfactant is a product marketed under the trademark Neodol 91-2.5 TM. Neodol 91-2.5 TM is sold by Shell Oil Company, Atlanta, Georgia. It is a linear primary alcohol derivative obtained by conventional ethoxylation, CAS number 68439-46-3.

The present oven cleaning composition includes other components to achieve desired properties. In particular, components are added to the composition to attain desired physical properties so that the composition adheres to vertical walls and interior ceilings of an oven. One such component is a foaming agent to assist in the formation of a desired foam cell structure. The term foaming agent generally refers to a compound or compounds which improve the cleaning composition's formation of a foam upon spraying of the composition from an aerosol can. A foaming agent, therefore, promotes the formation of uniformly sized bubbles in the cleaning composition having a size so that the foam has a desirable density and having the effect of long lasting bubbles. In particular, the foaming agent provides a foam which is sufficiently dense that enough of the active cleaning ingredient contacts the soiled surfaces of the oven, while having sufficient bubble structure to prevent collapse of the foam which leads to the cleaning composition running down vertical surfaces rather than adhering thereto. The selection of foaming agents in the art is well known and appropriate foaming agents can be selected by experimentation.

Foaming agents typically provide one of two functions. The first is to impart a sufficient surface tension to bubbles to prevent overly large-sized bubbles from forming. The second foaming agent characteristic is the prevention of bubbles from collapsing on themselves. Accordingly, the use of a foaming agent typically includes the use of one compound to achieve each of these functions. In particular, in one embodiment of the present invention, the foaming agent includes products marketed under the trademarks Sipex SB TM and Tryfac 5553 TM. Sipex SB TM is sold by Quantum Chemical Corporation, Cincinnati, Ohio and Tryfac 5553 TM is sold by Alcolac Chemicals, Baltimore, Md. Sipex SB TM is a sodium lauryl sulfate ($C_{12}H_{25}SO_4Na$) and Tryfac 5553 TM is a phosphated alkyl ethoxylate. The amount of foaming agent in the present composition depends upon the desired physical characteristics of a particular formulation. However, the total amount of foaming agent is typically an amount preferably from about 1 volume percent to about 3 volume percent, more preferably from about 1.5 volume percent to about 2.5 volume percent and most preferably from about 1.8 volume percent to about 2.2 volume percent. In the event that more than one foaming agent is used in the present invention, the total volume of all such compounds is typically within the above ranges.

The present composition can also include a compound or compounds to increase the viscosity of the composition components to improve the stability of the emulsion forming characteristics of the composition. Such compounds are referred to herein as viscosity agents. As is described below in more detail, the present composition is formed by preparing a mix of all water phase ingredients and a mix of all oil phase ingredients and then mixing the oil phase into the water phase. As this is done the resulting composition is believed to form an emulsion in an "oil out" fashion. Without wishing to be bound by theory, it is believed that if either the water phase or the oil phase is insufficiently viscous, that the resulting composition will switch between "water out" and "oil out" conditions, thereby impairing the effectiveness of the total composition. Again, without intending to be limited by theory, it is believed that by increasing the viscosity of both the water and/or the oil phase, upon mixing, the resulting composition will remain stably in an "oil out" condition.

Various viscosity agents are available to those skilled in the art and appropriate compounds can be identified and selected for particular formulations of the present composition by experimentation. Viscosity agents will be effective depending on whether they are intended for use in either the water phase or the oil phase of the present composition. In particular, in one embodiment of the invention, the viscosity agent for the water phase is dipropylene glycol methyl ether and the viscosity agent for the oil phase is mineral seal oil, a petroleum distilate cut at 600° to 700° F. Mineral seal oil is the last of the solvent cut and the start of the light oil cut. Mineral seal oil can be obtained, for example, from Ashland Chemical Co., Industrial Chemicals and Solvents Division, Columbus, Ohio. The viscosity agent for each of the water and oil phases is added to the composition in an amount preferably from about 6 volume percent to about 13 volume percent, more preferably from about 7 volume percent to about 12 volume percent and most preferably from about 8.5 volume percent to about 10.5 volume percent.

The present composition can also include a wetting agent to alter the surface chemistry of the cleaning composition to increase the amount of oven surface contacted by the cleaning composition. Numerous wetting agents are known in the art and appropriate wetting agents can be selected for particular formulas of the present composition by experimentation. The amount of wetting agent present in a particular composition will depend on the requirements of the desired application. However, in one embodiment of the present invention, the preferred wetting agent is ammonium hydroxide. The wetting agent is added to the composition in an amount preferably from about 0.1 to about 0.7 volume percent, more preferably from about 0.2 to about 0.6 volume percent and most preferably from about 0.3 to about 0.5 volume percent.

The present oven cleaning composition can alternatively include a chemical stabilizer to facilitate keeping the water and oil phase together. In one embodiment of the present invention, the chemical stabilizer is triethanolamine. The chemical stabilizer is typically added to the compound in an amount preferably from about 0.8 volume percent to about 1.6 volume percent, more preferably from about 1.0 to about 1.4 volume percent and most preferably from about 1.1 to about 1.3 volume percent. Other chemical stabilizers can be added to the compositions as well.

Other additives can optionally be included in the present composition. For example, components can be added to the oven cleaning composition that change the odor of the composition, if desired. In addition, components can be added to the oven cleaning composition to alter the final color of it, thus making it more appealing to the consumer. Further, additives with enhancing physical properties, such as a rust inhibitor, can be added.

The present invention also includes a process for producing the present oven cleaning composition. This process consists of mixing together all of the composition components which are miscible in oil to form an oil phase. The process also includes mixing together all of the composition components which are miscible in water to form a water phase. The oil phase premix is then added slowly and with good agitation into the water phase premix. The step of mixing the oil phase into the water phase has been found to be important for preparing an effective composition. This method of mixing produces an "oil-out" emulsion, which is necessary since the cleaning agent, for example, d-limonene, is contained in the oil phase. Thus, the cleaning agent is on the outside of the emulsion to allow for more rapid, intimate contact with oven surfaces. If, however, the water phase is mixed into the oil phase to produce a "water-out" emulsion, the resulting composition is not as effective in cleaning because the cleaning agent is enveloped by water.

After the water phase premix is prepared, it is placed in a vessel of sufficient volume to hold the entire volume of both the water phase and the oil phase premixes. The water phase premix is then agitated to ensure that as the oil phase is added, the oil phase will be rapidly and completely dispersed throughout the water phase premix. The rate of addition will be a function of the degree of agitation and many forms of agitation will be apparent to those skilled in the art. For example, the water phase premix can be agitated by a stir bar, a paddle or the like. Alternatively, the water phase premix can be agitated by movement of the vessel to achieve mixing of the liquids therein.

The composition resulting from the above procedure is then packaged into aerosol containers for final use. Many propellants and spray valves/nozzles are known and commonly available. In the present application, it is preferred that the propellant be soluble in the cleaning composition. Without intending to be bound by theory, it is believed that by being soluble in the cleaning composition, the propellant imparts more desirable physical characteristics to the composition when sprayed. In particular, a soluble propellant is thought to impart a more foam-like texture whereas an insoluble propellant would impart a more liquid texture. One such soluble propellant is A-55 for the present composition, which is a mixture of 30% propane and 70% isobutane. Further, the spray nozzle should provide a desirable spray pattern and foam texture. Such a nozzle can be selected to suit the particular application, from those commonly available. For example, a mechanical breakup actuator nozzle (or high shear mixer) is advantageous.

As previously mentioned, the cleaning composition made by the above procedure is an oil-out emulsion. Without intending to be bound by theory, the above composition has an improved cleaning effectiveness when it is formulated and packaged so that subsequent to application to a soiled surface, the emulsion inverts to a water out emulsion. In this manner, upon application, the cleaning agent, which is in the oil phase, is exposed to the soiled surface and can soften and loosen the debris. Upon inversion, the external oil phase with dissolved debris is then surrounded by external water. The resulting water-out emulsion can then be easily removed with a water rinse.

As will be appreciated by those skilled in the art, the composition formulation can be adjusted to cause an oil-out to water-out inversion after application of the composition in various ways. In particular, use of a mechanical breakup actuator or a high shear nozzle with the present oil-out composition will reduce the emulsion particle size as the composition is sprayed, thereby increasing the tendency toward inversion. As a given emulsion particle is broken in half by being sprayed through a high shear nozzle, the ratio of thickness of the outer oil layer to inner water layer will decrease, thereby making the outer layer relatively thinner. The outer layer of oil thereby loses its strength and is more likely to be inverted.

Alternatively, or in addition to the above mechanism, the use of a hydrocarbon propellant with the present composition promotes emulsion particle inversion subsequent to application of the composition. Use of a hydrocarbon propellant, such as A-55, favors an oil-out emulsion prior to application because it increases the volume of oil phase components. Subsequent to application, and particularly in conjunction with a high shear nozzle, as the components of the hydrocarbon propellant volatilize, the volume of the oil phase decreases, thereby losing its strength and favoring conditions for an inversion to a water out emulsion. The composition thereby reaches a condition which favors water-out emulsion and inversion occurs. Such inversion will occur in a time frame dependent on the overall formulation characteristics and on the composition of the oven debris. For oily debris, the cleaning composition is likely to stay in an oil-out emulsion longer. The composition should be formulated so that, upon contact with a soiled surface, the cleaning agent has sufficient time to act on soiled material prior to inversion. Also, however, the inversion should occur within desired cleaning time. More specifically, the inversion should occur between about 10 and 15 minutes, between about one hour and one hour, 30 minutes, or between about 10 and 14 hours.

The present invention also includes methods for use of the subject oven cleaning composition. The composition is sprayed evenly over the oven surfaces to be cleaned and is allowed to contact the surface for a desired time to act on and loosen oven debris. The oven surfaces are then rinsed with warm water one or more times to remove the oven cleaning composition and loosen debris. Further, the oven cleaner can be more effective when an additional layer of cleaner is applied just prior to rinsing. The present composition is generally more effective when the oven to be cleaned is preheated. Generally, for faster cleaning of an oven, the preheat temperature should be higher. However, in any case, the preheat temperature should be generally less than about 150° F. to avoid vaporization of components of the oven cleaning composition.

Two particular methods for oven cleaning are provided. A fast cleaning procedure consists of preheating an oven, preferably from about 65° F. to 130° F., most preferably from about 90° F. to 115° F., applying the oven cleaning composition to the oven surfaces and leaving the composition on the surfaces preferably from about 10 to 60 minutes, most preferably from about 25 to 35 minutes, and rinsing the composition loosened debris from the surfaces with warm water preferably from about 1 to 5 times and most preferably 2 times.

In an overnight cleaning method, oven temperature is maintained at, preferably from about room temperature to about 110° F., most preferably from about 70° F. to 90° F., the oven cleaning composition is applied and left in contact with the oven surfaces preferably from about 6 to 18 hours, most preferably from about 8 to 14 hours. After the contact period, a second coat of said oven cleaning composition can be applied to assist in the removal of the debris and previous composition layer. The oven cleaning composition and loosened debris are then rinsed from the surfaces with warm water for preferably from about 1 to 4 times and most preferably 2 times.

The following Examples are designed for purposes of illustration only and are not intended to limit the scope of the present invention.

EXAMPLE 1

The components of the cleaning composition are identified as being either oil phase or water phase components. The oil phase consists of 30% by volume d-limonene, 1.6% by volume Neodol 91-2.5 TM, 1.2% by volume TEA (Triethanolamine), 0.6% by volume Emsorb 2502 TM, and 10.0% by volume mineral seal oil. The water phase consists of 43.7% by volume water, 1.0% by volume Tryfac 5553 TM, 1.0% by volume Sipex SB TM, 0.4% by volume ammonium hydroxide, 9.0% by volume DPM (dipropylene glycol methyl ether), 1.0% by volume Macol NP-7 TM, and 0.5% by volume Sole-Mulse B TM. Table 1.1 lists components for a 5-liter batch of cleaner.

TABLE 1.1

| | % by Volume | Volume in 5-liter Batch |
|---|---|---|
| OIL PHASE | | |
| d-Limonene | 30.0 | 1500 ml |

TABLE 1.1-continued

| | % by Volume | Volume in 5-liter Batch |
|---|---|---|
| Neodol 91-2.5 TM | 1.6 | 80 ml |
| TEA | 1.2 | 60 ml |
| Emsorb 2502 TM | 0.6 | 30 ml |
| Mineral seal oil | 10.0 | 500 ml |
| WATER PHASE | | |
| Water | 43.7 | 2185 ml |
| Tryfac 5553 TM | 1.0 | 50 ml |
| Sipex SB TM | 1.0 | 50 ml |
| Ammonium Hydroxide | 0.4 | 20 ml |
| DPM | 9.0 | 450 ml |
| Macol NP-7 TM | 1.0 | 50 ml |
| Sole-Mulse B TM | 0.5 | 25 ml |

The two phases are separately pre-mixed. The oil phase is then slowly added to the water phase. Agitation is maintained during the mixing of the two phases to ensure rapid dispersion of the oil phase.

After the cleaning composition has been thoroughly mixed, it is packaged into aerosol containers with A—55 propellant. The container is topped with a MARC TM 26—1832 spray valve/nozzle and is ready for use.

EXAMPLE 2

A soil composition of 84% corn oil, 8% sugar, and 8% flour is mixed together at about 150° F. and allowed to cool to room temperature. The soil composition is then applied to the interior walls of an oven with a paint brush in one direction only. The oven is then heated to about 450° F. and held for 20 minutes. After being allowed to cool to room temperature (70° F.), a layer of the cleaning composition produced according to Example 1 about ¼ inch thick, is applied evenly to the interior of the oven with the aerosol container. The composition is left in contact with the oven walls for about 12 hours. After 12 hours have elapsed, a second coat of said cleaning composition is applied. Then the oven cleaner is rinsed from the oven walls with warm water and a sponge. This rinsing procedure is repeated to ensure removal of all cleaning composition. Upon completion of the aforementioned steps, the oven walls are virtually free of any baked-on soil composition.

While various embodiments of the present invention have been described in detail, it is apparent that modifications and adaptations of those embodiments will occur to those skilled in art. However, it is expressly understood that such modification and adaptations are within the scope of the present invention, as set forth in the following claims.

What is claimed is:

1. A method for producing an oven cleaner, comprising:
   (a) premixing components miscible in oil to form an oil phase, said components comprising a terpene, a mineral seal oil surfactant miscible in oil, and a chemical stabilizer;
   (b) premixing components miscible in water to form a water phase, said water phase comprising a foaming agent, a viscosity agent, and a surfactant miscible in water;
   (c) mixing said oil phase into said water phase while agitating said water phase, wherein an "oil-out" emulsion composition is produced that inverts to a "water-out" emulsion upon application to a soiled surface.

2. A method of producing an oven cleaner as claimed in claim 1, wherein said oil phase components comprise d-limonene, linear primary alcohol, ethoxylate triethanolamine, sorbitan sesquioleate and mineral seal oil and said water phase components comprise water, phosphated alkyl ethoxylate, sodium lauryl sulfate, ammonium hydroxide, dipropylene glycol methyl ether, nonylphenol polyethylene glycol ether, (nonylphenoxy) polyethylene oxide and a sodium salt of petroleum solfonic acid.

3. An oven cleaner produced in accordance with the method of claim 1.

4. An oven cleaner composition produced in accordance with claim 1 consisting essentially of:
   a component selected from the group consisting of d-limonene, alpha-terpineol, beta-terpineol, alpha-pinene, beta-pinene, and mixtures thereof, said component present in an amount from about 10 volume percent to about 60 volume percent;
   a cleaning surfactant selected from the group consisting of sorbitan sesquioleate, (nonylphenoxy) polyethylene oxide, sodium salts of petroleum sulfonic acid and mixtures thereof, said cleaning surfactant present in an amount from about 0.2 volume percent to about 2.0 volume percent a mineral seal oil in an amount from about 6 volume percent to about 13 volume percent;
   a foaming agent selected from the group consisting of sodium lauryl sulfate, phosphate alkyl ethoxylate and mixtures thereof, said foaming agent present in an amount from about 1 volume percent to about 3 volume percent; and
   a wetting agent comprising ammonium hydroxide, present in an amount from about 0.1 volume percent to about 0.7 volume percent.

5. An oven cleaner produced in accordance with claim 1 comprising:
   a) 30.0 percent by volume of d-limonene;
   b) 1.6 percent by volume of linear primary alcohol ethoxylate;
   c) 1.2 percent by volume of triethanolamine;
   d) 0.6 percent by volume of sorbitan sesquioleate;
   e) 10.0 percent by volume of mineral seal oil;
   f) 43.7 percent by volume of water;
   g) 1.0 percent by volume of phosphated alkyl ethoxylate as a foaming agent;
   h) 1.0 percent by volume of sodium lauryl sulfate as a foaming agent;
   i) 0.4 percent by volume of ammonium hydroxide;
   j) 9.0 percent by volume of dipropylene glycol methyl ether;
   k) 1.0 percent by volume of nonylphenol polyethylene glycol ether; and
   l) 0.5 percent by volume of (nonylphenoxy) polyethylene oxide and a sodium salt of petroleum sulfonic acid,
   whereby said foaming agent enables said oven cleaner to adhere to vertical walls and interior overhead ceilings of an oven.

6. A method of producing an oven cleaner as claimed in claim 5 wherein said oil phase components comprise d-limonene, linear primary alcohol ethoxylate, triethanolamine, sorbitan sesquioleate, and mineral seal oil, and said water phase components comprise water, phosphated alkyl ethoxylate, sodium lauryl sulfate, ammonium hydroxide, dipropylne glycol methyl ether, nonylphenol polyethylene glycol ether, and (nonylphenoxy)

polyethylene oxide and a sodium salt of petroleum sulfonic acid.

7. A method for cleaning an oven having debris on interior oven surfaces, comprising:

a) contacting the oven cleaner as produced in accordance with claim 5 to interior oven surfaces; and b) rinsing said oven cleaner and debris from said interior oven surfaces.

8. A method for cleaning an oven having debris on interior oven surfaces, as claimed in claim 7, further comprising preheating said oven to a temperature up to 150° F.

9. A method for cleaning an oven having debris on interior oven surfaces as claimed in claim 8 further comprising maintaining said preheat temperature during said step of contacting.

10. An oven cleaning composition as claimed in claim 5, further comprising a hydrocarbon propellant.

11. An oven cleaning composition as claimed in claim 9, wherein said propellant is a hydrocarbon propellant.

12. Oven cleaning composition as claimed in claim 5, wherein said composition is packaged in an aerosol can having a mechanical breakup actuator nozzle.

13. The oven cleaner composition as set forth in claim 5 further comprising a stabilizer comprising triethanolamine present in an amount from about 1.8 volume percent to about 1.6 percent.

14. The oven cleaner composition as set forth in claim 5 further comprising a viscosity agent comprising dipropylene glycolmethylether, present in an amount from about 6 volume percent to about 13 volume percent.

* * * * *

UNITED STATES PATENT AND TRADEMARK OFFICE

CERTIFICATE OF CORRECTION

PATENT NO. : 5,204,016

DATED : April 20, 1993

INVENTOR(S) : Hamilton et al.

It is certified that error appears in the above-identified patent and that said Letters Patent is hereby corrected as shown below:

In Claim 7, column 11, line 6, please delete "5" and insert therefor -- 4 --.

In Claim 10, column 12, line 2, please delete "5" and insert therefor -- 4 --.

In Claim 11, column 12, line 4, please delete "9" and insert therefor -- 10 --.

In Claim 12, column 12, line 5, please delete "5" and insert therefor -- 4 --.

In Claim 13, column 12, line 9, please delete "5" and insert therefor -- 4 --.

In Claim 14, column 12, line 13, please delete "5" and insert therefor -- 4 --.

UNITED STATES PATENT AND TRADEMARK OFFICE

CERTIFICATE OF CORRECTION

PATENT NO. : 5,204,016

DATED : April 20, 1993

INVENTOR(S) : Hamilton, et. al.

It is certified that error appears in the above-indentified patent and that said Letters Patent is hereby corrected as shown below:

In Claim 6, column 10, line 62, please delete "5" and insert therefor -- 4 --.

Signed and Sealed this

First Day of February, 1994

Attest:

BRUCE LEHMAN

Attesting Officer

Commissioner of Patents and Trademarks